United States Patent [19]
Cassel

[11] Patent Number: 5,632,513
[45] Date of Patent: May 27, 1997

[54] LAP JOINT BETWEEN FLEX HOSE AND RIGID PIPE

[75] Inventor: Scott T. Cassel, Birmingham, Mich.

[73] Assignee: BKS Company, Auburn Hills, Mich.

[21] Appl. No.: 600,478

[22] Filed: Feb. 13, 1996

Related U.S. Application Data

[63] Continuation of Ser. No. 491,534, Jun. 16, 1995, abandoned, which is a continuation of Ser. No. 186,015, Jan. 24, 1994, abandoned.

[51] Int. Cl.$^6$ .................................... F16L 21/06
[52] U.S. Cl. ..................... 285/322; 285/252; 285/420
[58] Field of Search .................... 285/322, 419, 285/420, 422, 424, 252, 253, 382, 243

[56] References Cited

U.S. PATENT DOCUMENTS

| Re. 30,042 | 7/1979 | Hiemstra et al. |
|---|---|---|
| 3,944,265 | 3/1976 | Hiemstra et al. ............... 285/419 |
| 4,113,289 | 9/1978 | Wagner et al. |
| 4,261,600 | 4/1981 | Cassel . |
| 4,270,689 | 6/1981 | Canfield . |
| 4,312,526 | 1/1982 | Cassel . |
| 4,536,019 | 8/1985 | Quaranta ............... 285/420 |
| 4,629,226 | 12/1986 | Cassel et al. . |
| 4,660,862 | 4/1987 | Cassel et al. ............... 285/420 |
| 4,850,621 | 7/1989 | Umehara ............... 285/420 |

FOREIGN PATENT DOCUMENTS

| 4583 | of 1914 | United Kingdom ............... 285/420 |

*Primary Examiner*—Eric K. Nicholson
*Attorney, Agent, or Firm*—Reising, Ethington, Barnard & Perry

[57] ABSTRACT

A coupling is provided between a flex hose and a rigid pipe by a lap joint with an end of the rigid pipe inserted into an end of the flex hose to form an overlap region. The flex hose has at least one slot through its wall extending axially of the flex hose and spanning the helical strip in a convolution which is in the overlap region. The slot is spaced inwardly from the end of the flex hose. A clamp disposed around the flex hose covers the slot and clamps the flex hose and pipe together collapsing the overlap region of the flex hose by circumferential slippage of adjacent convolutions of the helical strip to cause close engagement of the flex hose with the pipe and with the band clamp.

7 Claims, 2 Drawing Sheets

LAP JOINT BETWEEN FLEX HOSE AND RIGID PIPE

This application is a continuation of application Ser. No. 08/491,534 filed on Jun. 16, 1995, now abandoned, which is a continuation of U.S. application Ser. No. 08/186,015 filed Jan. 24, 1994, now abandoned.

FIELD OF THE INVENTION

This invention relates to pipe couplings; more particularly, it relates to a pipe lap joint with a flex hose, especially adapted for use in vehicle exhaust systems.

BACKGROUND OF THE INVENTION

In engine exhaust systems for trucks, it is a common practice to use a metal flex hose connected with a rigid pipe. It has become important to join the flex hose and the pipe with a coupling which will minimize the leakage of exhaust gases at the joint. The cylindrical wall of the flex hose is inherently somewhat leaky throughout its length and it is desired to provide a coupling with a rigid pipe with a joint which seals against leakage at least as well as the wall of the flex hose itself.

In the prior art, flex hose has been joined to rigid pipe in a lap joint with a band clamp tightened around the overlap region between the flex hose and pipe. However, such an arrangement does not provide a good seal at the lap joint because the clamp is incapable of collapsing the flex hose into sealing engagement with the pipe. In order to make the lap joint, the flex hose must have an inside diameter somewhat greater than the outside diameter of the pipe to permit insertion of the pipe; because of manufacturing tolerances, the difference in diameters is sometimes greater than that needed for insertion and, in such instances, the joint exhibits high leakage.

Also in the prior art, lap joints between flex hose and rigid pipe are known which utilize a wide band clamp which spans the rigid pipe and the flex hose and is tightened so that it is in close engagement with the outer surface of both the flex hose and the pipe to thereby seal the joint. The close engagement may be achieved by pre-forming the band clamp to accommodate the smaller diameter of the rigid pipe. Alternatively, the band clamp is of uniform diameter prior to installation and is deformed sufficiently during tightening to provide engagement thereof with both the flex hose and pipe. Lap joints of this type are disclosed in U.S. Pat. Reissue 30,042 granted Jul. 10, 1979 to Heimstra, et al.; U.S. Pat. No. 4,261,600, granted Apr. 14, 1981 to Cassel; and U.S. Pat. No. 4,312,526 granted Jan. 26, 1982 to Cassel. While certain lap joints of this type are meritorious in some respects, they are disadvantageous in respect to cost and materials. Further, this type of clamp does not lend itself to applications in which the lap joint is located immediately adjacent an elbow in the rigid pipe because there is not enough straight pipe to accept the band clamp portion.

Lap joints for coupling two rigid pipes are known in the prior art in which the outer pipe end is adapted to be collapsed by use of a band clamp. In U.S. Pat. No. 4,270,689 granted Jun. 2, 1981 to Canfield, lap joint is disclosed in which the outer pipe is provided with take-up slots in the overlap region of the pipe-ends to facilitate the collapsing of the outer pipe-end into engagement with the inner pipe by a band clamp. In this arrangement, the take-up slots do not extend through the end of the pipe; instead, they terminate at a point inwardly of the pipe-end and are sometimes referred to as "captured" slots. U.S. Pat. No. 4,113,289 granted Sep. 12, 1978 to Wagner et al. describes a lap joint for rigid pipes which utilizes a set of captured slots in the end of the outer pipe and a set of relief slots which are disposed adjacent respective captured slots. The relief slots extend all the way to and are open at the end of the outer pipe. U.S. Pat. No. 4,629,226 granted Dec. 16, 1986 to Cassel et al. describes a rigid pipe lap joint having an outboard slot which extends inwardly from the pipe-end and an inboard slot circumferentially offset and extending inwardly from the inner end of the outboard slot. The end walls of the adjacent ends of the inboard and outboard slots are disposed in edge-to-edge engagement with each other when the overlap region of the outer pipe is clamped into close fitting engagement with the inner pipe.

A general object of this invention is to provide an improved lap joint for coupling a rigid pipe to a flex hose and to overcome certain disadvantages of the prior art.

SUMMARY OF THE INVENTION

In accordance with this invention, a lap joint between a flex hose and a rigid pipe is provided which exhibits good sealing engagement therebetween and which is economical to manufacture and reliable in operation.

In accordance with this invention, a coupling is provided between a rigid pipe and a flex hose of the type having a cylindrical wall comprising a helical strip with multiple convolutions and an interlock seam between adjacent convolutions. This is accomplished by separating the helical strip into two or more arcuate segments and providing a gap between the opposed ends of adjacent segments, for example, by punching one or more axially extending slots through the wall of the flex hose to form the segments and to define an annular sealing zone. One end of the rigid pipe is inserted into one end of the flex hose past the sealing zone. A radial force is then applied to the segments in the sealing zone to reduce the radius of the segments and thereby obtain close engagement thereof with the outer surface of the pipe. Preferably, the radial force is applied by tightening a band clamp around the sealing zone thereby covering the slots in the flex hose.

Further, in accordance with this invention, a coupling between a rigid pipe and a flex hose comprises an arrangement in which one end of the rigid pipe extends into one end of the flex hose to form an overlap region. The flex hose has at least one captured slot in the overlap region. A clamping band is disposed around the flex hose for covering the slot and for collapsing the flex hose under the band by circumferential slippage in the seam between adjacent convolutions of the flex hose to cause close engagement thereof with the pipe and with the band.

Further, in accordance with this invention, the flex hose is of the type having a cylindrical wall comprising a helical strip with multiple convolutions with an interlock seam between adjacent convolutions which allow circumferential slippage. The strip has a cross-section in the shape of an Shook whereby an interlock seam comprises interleaved hook portions providing a helical passage within the seam. The slot defines an opening through the interleaved layers of hook portions and each layer in engagement with the adjacent layer around the periphery of the slot whereby leakage into the slot from the helical passage in is inhibited.

Further, in accordance with this invention, plural slots are spaced around the circumference of the flex hose and are spaced substantially equidistantly from each other. The axial length of each slot is at least as great as the width of the helical strip but less than twice the width of the strip.

Preferably, the clamping band has a width which is approximately 1.4 times the axial length of the slot. Preferably also, the slot has a width in the circumferential direction which is approximately one-fifth of the width of the strip.

A complete understanding of this invention may be obtained from the detailed description that follows taken with the accompanying drawings.

BEST MODE FOR CARRYING OUT THE INVENTION

Figure 1:
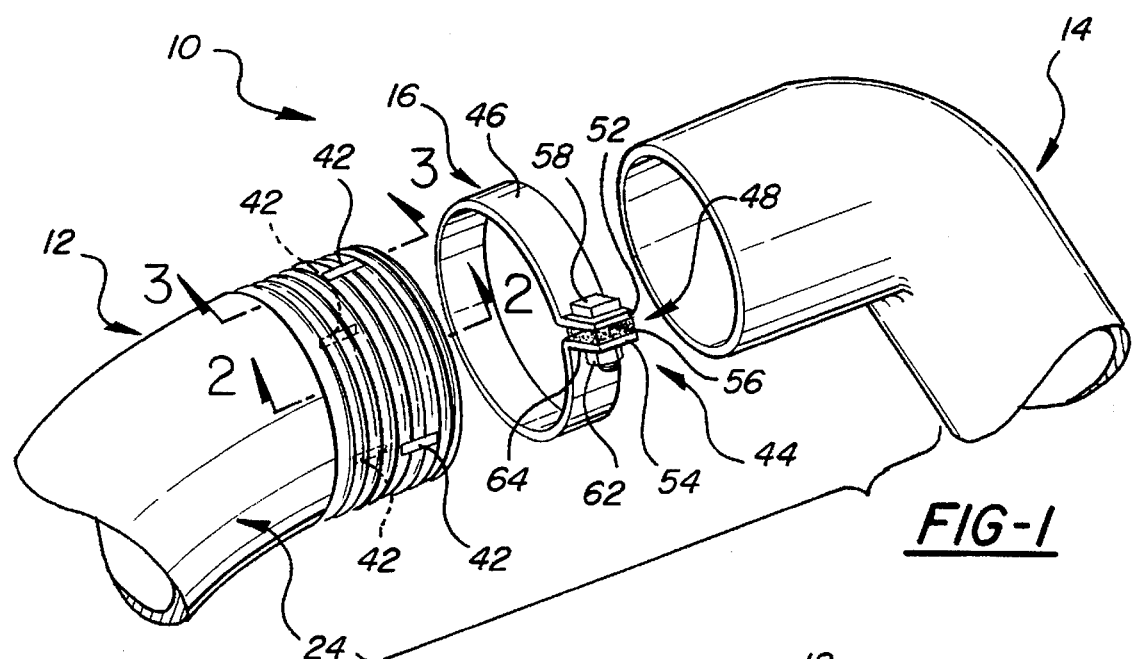
FIG. 1 is a perspective view of the parts of a coupling between a flex hose and a rigid pipe prior to assembly.

Referring now to the drawings, there is shown an illustrative embodiment of the invention in a lap joint between a flex hose and a rigid pipe in a vehicle exhaust system. It will be appreciated as the description proceeds that the invention is useful in other embodiments and applications.

Figure 4:
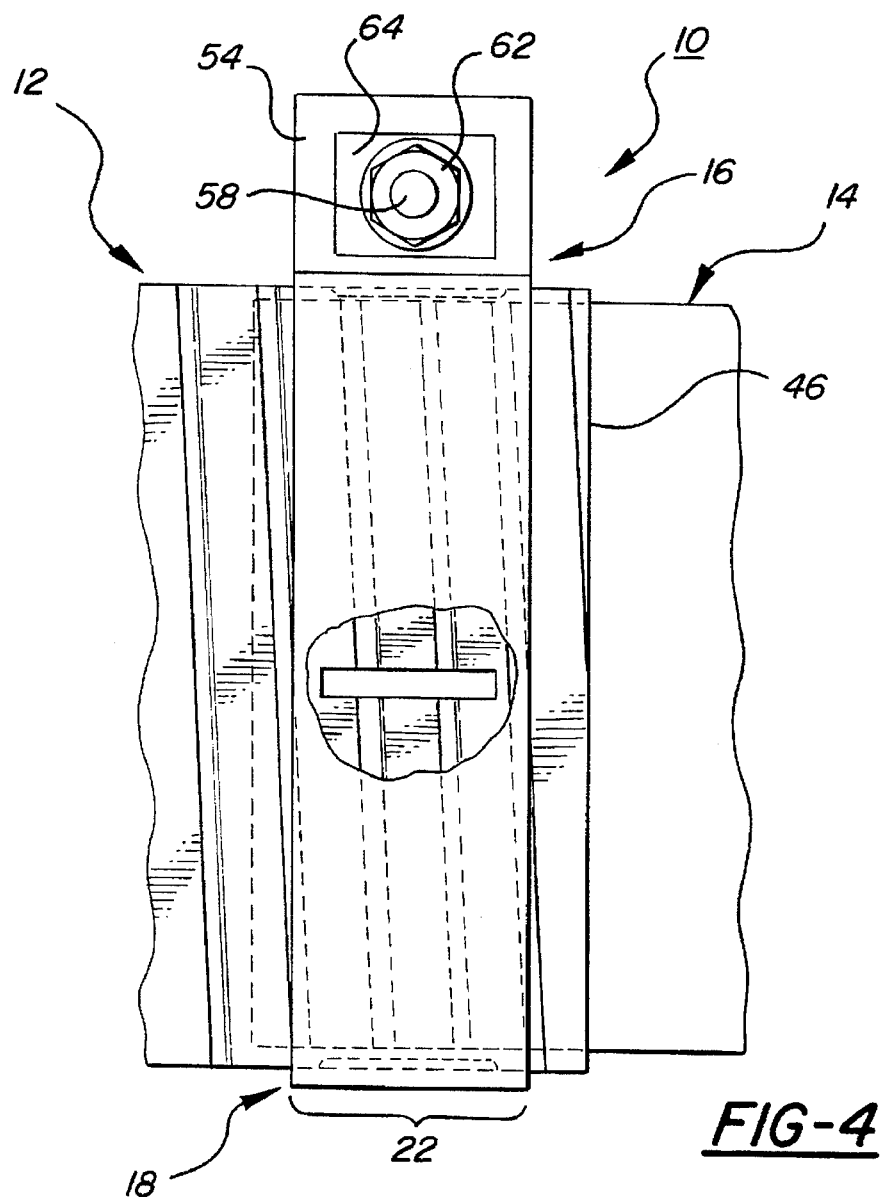
FIG. 4 is an elevation view, partially broken away, of the coupling prior to tightening of the band clamp.

As shown in the drawings, the coupling 10 of this invention is a lap joint which comprises a flex hose 12, a rigid pipe 14 and a band clamp 16. The rigid pipe 14 is part of an engine exhaust pipe formed with an elbow adjacent its free end and is typical of a truck installation. The flex hose 12 connects the pipe 14 with a muffler not shown in a vertical exhaust stack of the truck. The coupling 10 is provided by insertion of the end of pipe 14 into the end of the flex hose 12 in telescoping relation with the band clamp 16 disposed around the end of the flex hose 12. The flex hose 12 has a lap portion which extends over the pipe 14 to provide an overlap region 18 between the end of the pipe and the end of the flex hose, as shown in FIG. 4. In order to provide for sealing engagement between the inside of the flex hose and the outside of the pipe, a radially collapsible sealing zone 22 is provided on the flex hose in the form of a circumferential band within the overlap region 18 (see FIG. 4). The radially collapsible sealing zone 22 will be described in detail presently.

Figure 2:
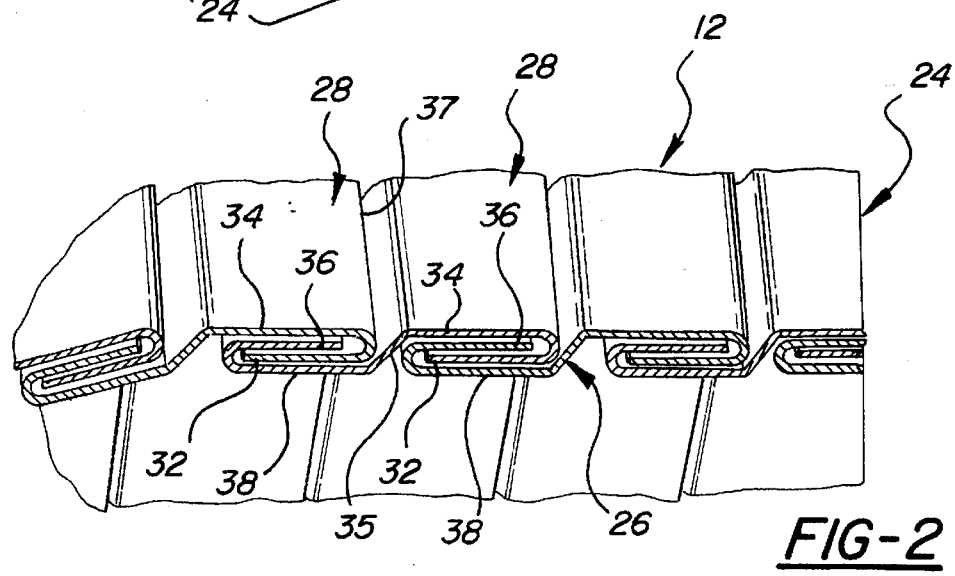
FIG. 2 is a cross-sectional view taken on lines 2—2 of FIG. 1.

The flex hose 12 is of conventional construction as shown in FIG. 2. The flex hose has a cylindrical wall 24 which comprises the single continuous helical strip 26 which is wound to form multiple convolutions with an interlock seam 28 between adjacent convolutions. The strip 26 is typically sheet metal such as stainless steel. The strip 26 has a cross-section in the shape of an S-hook with an outside hook at one edge of the strip being formed with straight-sided hook portions 32 and 34 and with an inside hook at the other edge being formed with straight-sided hook portions 36 and 38. The interlock seam 28 comprises the hook portion 32 interleaved between the hook portions 36 and 38 and the hook portion 36 interleaved between hook portions 34 and 32 whereby each hook portion constitutes a layer in the seam. The interlock seam 28 provides a slip joint between adjacent convolutions which allows relative movement therebetween in the axial direction of the flex hose whereby the flex hose may be formed to follow a straight or an arcuate path.

The flex hose 12 has a leakage path which extends from inside the cylindrical flex hose through the interlock seam 28. This leakage path extends between the four layers of the seam to the atmosphere, i.e. between hook portions 34 and 36, thence between hook portions 36 and 32 and finally between hook portions 32 and 38. This leakage path will be referred as the "seam leakage path".

With the end of rigid pipe 14 inserted inside the end of flex hose 12 in a loose fit, there is a leakage path which extends in the axial direction around the circumference of the rigid pipe due to the loose fitting engagement. This leakage path will be referred to as the "axial leakage path". When the flex hose and rigid pipe are in a tight fitting engagement throughout the overlap region 18, there is another leakage path which extends between the outside diameter of pipe 14 and the inside of diameter flex hose 12 along the helical groove 35 formed on the inside diameter of the flex hose. This leakage path will be referred to as the "inside helical groove leakage path". When the band clamp 16 is disposed on the flex hose in a tight fitting engagement, there is still another leakage path which extends between the inside diameter of the band clamp and the outside diameter of the flex hose along the helical groove 37 formed on the outside diameter of the flex hose. There is leakage through the seam leakage path to the outside helical groove 37 and thence to the atmosphere. This leakage path will be referred to as the "outside helical groove leakage path".

As will be described below, the coupling of this invention is effective to inhibit and substantially reduce the leakage through the seam leakage path, the axial leakage path and the two helical groove leakage paths which were discussed above. This is accomplished by the coaction of the sealing zone 22 and the band clamp 16 as described below.

According to the invention, one or more slots 42 are provided in the sealing zone 22 of the flex hose 12. In the embodiment shown, there are four slots 42 which are spaced approximately equally in the circumferential direction. Each slot is cut through the wall of the flex hose and extends in the axial direction of the flex hose and the slots are spaced inwardly from the end of the flex hose by approximately equal distances. The slots are suitably of the same length which is great enough so that at least one slot spans the entire width of the helical strip 26 so that a segment of the strip in the sealing zone is separated from the main body of the helical strip inboard of the sealing zone. Thus, at least one separated or free segment of the strip is provided in the sealing zone. The end of such free segment is separated by a gap from the end of the main body of the strip or an adjacent free segment of the strip, as the case may be. The gap, which is equal to the width of the slot provides clearance to permit circumferential sliding or slippage of the free segment or segments of the strip, as will be discussed further below.

Preferably the length of the slot is less than twice the width of the helical strip 26 in order to minimize the width of the band clamp 16 required to cover the slots. The band clamp has a width which is approximately 1.4 times the axial length of the slot. Preferably, each slot has a width in the circumferential direction which is approximately one-fifth of the width of the helical strip 26 of the flex hose. In a typical flex hose of four inch diameter, the helical strip is five-eighths inch wide. The slot size is suitably seven-eighths of an inch long and one-eight of an inch wide. The band clamp has a width of one and one-fourth inches.

Figure 3:
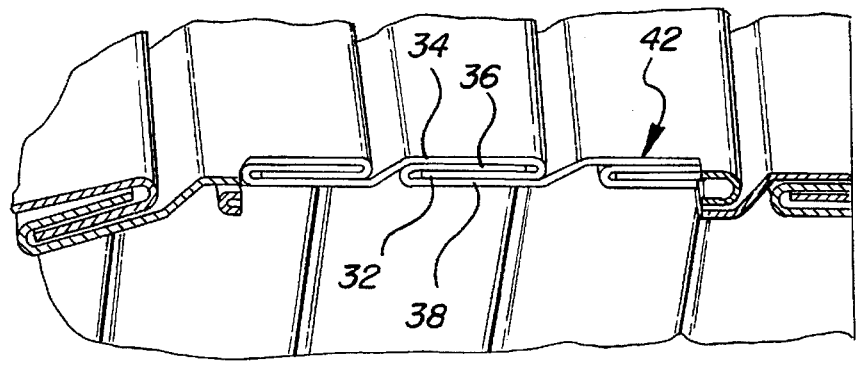
FIG. 3 is a cross-sectional view taken on lines 3—3 of FIG. 1.

The structure of the slot 42 and the annular sealing zone 22 are shown in detail in FIGS. 3 and 4. As shown in FIG.

3, the slot 42 is bounded by the interleaved hook portions 32, 34, 36 and 38 which are locally deformed so that each hook portion is in engagement with each adjacent hook portion to provide a substantially closed peripheral wall of the slot. This feature will be described further subsequently. Preferably, the slots 42 are formed in the wall of the flex hose by a conventional sheet metal punching operation which produces the structure just described at the peripheral wall of the slot.

The coupling 10 is assembled by inserting the end of pipe 14 into the flex hose 12 and tightening the band clamp 16 around the sealing zone 22. The clamp 16 is preferably of the type which is described in detail in U.S. Pat. No. 4,312,526, cited above, or an equivalent which is capable of applying the requisite compressive force to the sealing zone 22. The band clamp 16 fully covers the slots 42, as set forth above and is provided with a tightening means 44. It has a roundish sector 46 adapted to fit around the sealing zone 22 on the flex hose 12 and a channel-shaped sector 48 which comprises a pair of sidewalls 52 and 54 extending radially outwardly from the roundish sector. The roundish sector 46 is made from a single piece of sheet metal and each free end thereof is folded back on itself to form a double layer. Thus, the sidewalls 52 and 54 are of double thickness and terminate at their outer ends in respective loops or bights. The bights serve as retaining members for holding the sidewalls in place when the tightening means 44 is tightened, as will be described presently.

The band clamp 16 is tightened around the flex hose at the sealing zone 22 by the tightening means 44. The tightening means comprises a reaction member or spline 56 which is disposed within the channel-shaped sector 48 and which is adapted to seat upon the outer surface of the sealing zone 22. For this purpose, the spline has an inner surface of arcuate configuration conforming to a circumferential sector of the flex hose. The spline is provided with a pair of oppositely facing concave surfaces adapted to receive the respective sidewalls 52 and 54. The tightening means includes a bolt 58 and a nut 62. It also includes a spacer 64 disposed outside the sidewall 54 and having a convex surface which is opposite the concave surface of the spline 56. The bolt 58 has a head with a convex surface which is disposed outside the sidewall 52 opposite the concave surface on the spline 56. The bolt 58 extends through holes in the sidewalls 52 and 54, the spline 56 and the spacer 64 into threaded engagement with the nut 62.

Figure 5:
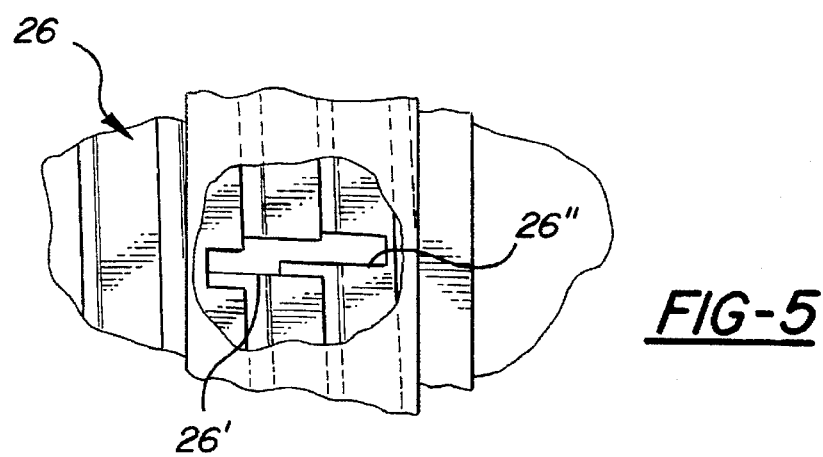
FIG. 5 is a fragmentary view showing the relationship of certain parts after the clamp has been tightened.

When the coupling 10 is assembled and the nut 62 is tightened on the bolt 58, the relationship of the parts is as shown in FIG. 5. It will be understood that, before the nut and bolt are tightened, the band clamp 16 is in loose fitting engagement with the flex hose 12 as depicted in FIG. 4. Also, before the nut 62 is tightened on the bolt 58, the sidewalls 52 and 54 of the channel-shaped sector 48 are not seated against the spline 56. When the nut is tightened, the head of the bolt 58 and the spacer 64 are drawn together and press the sidewalls into seating engagement with the spline. As a result of this tightening action the roundish sector 46 is stretched around the sealing zone 22 of the flex hose 12 in tight engagement therewith.

The tightening action of the band clamp 16 exerts sufficient force on the sealing zone 22 to collapse the sealing zone radially so that its circumference is reduced to provide tight engagement between the innermost hook portion 38 of the helical strip 26 with the outer surface of the pipe 14. The collapse of the sealing zone 22 is achieved by circumferential sliding action or slippage of the free segments of the helical strip 26 which have been severed by the slots 42. This slippage results in a change in the configuration of the peripheral wall of the slots 42. The relative slippage or shifting of the free segments of the strip results in side-by-side ends of the strip segments to be offset which will vary from case-to-case. An example of the offset ends is shown in FIG. 5. In effect, each severed segment of the helical strip 26 is reformed by the radial force exerted by the clamp to have a smaller radius equal to that of the pipe 14 and thus it covers a larger arcuate segment on the surface of the pipe. Note that the end of free segment 26' of the helical strip is offset with reference to the end of the main body of strip 26 which is outside the sealing zone 22. Also, the end of free segment 26" is offset from the segment 26'. Thus, by reason of the circumferential slippage between the adjacent segments, tight engagement of the hook portion 38 with the outer surface of the pipe 14 is achieved without puckering of the metal and the axial leakage path described above is substantially closed.

Furthermore, the compressive force applied by the band clamp 16 is effective to produce some crushing of the layers 34, 36 and 32 of the interlock seams 28 to reduce the spacing therebetween. This results in a substantial closure of the seam leakage path which was discussed above. This radial crushing of the interlock seam 28 also effectively reduces the cross-sectional area of the inside helical groove 35 and of the outside helical groove 37. Consequently, the inside helical leakage path between the pipe 14 and the flex hose 12, as 5 discussed above, is reduced and the outside helical leakage path between the band clamp 16 and the flex hose, as discussed above, is also reduced. The closed peripheral walls of the slots, discussed above, also provides for a substantial reduction of leakage through the external helical groove leakage path discussed above. This obtains because of the restriction of leakage from the seam 28 into the slot 42 which communicate directly with the external helical groove 37.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A coupling between a rigid pipe and a flex hose, said flex hose being of the type having a cylindrical wall comprising a helical strip with multiple convolutions and an interlock seam between adjacent convolutions which allows circumferential slippage between convolutions, said helical strip having a uniform width portion extending throughout multiple convolutions, said flex hose terminating at one end in an end-convolution of said strip which diminishes in width toward the free end thereof, said coupling comprising:

the rigid pipe having one end extending inside said one end of the flex hose to provide an overlap region of the ends of the flex hose and the pipe, said overlap region on the flex hose defining plural slots through said wall, said slots extending generally axially of the flex hose and completely spanning said helical strip at circumferentially spaced locations in a single convolution of said uniform width portion, each slot thereby providing two oppositely disposed free ends of the uniform width portion of said strip which are completely severed from each other and which are spaced apart to allow the convolutions in the vicinity of said slots to be deformed to a reduced circumference by reduction of the spacing between said free ends of said uniform width portion of said strip, said single convolution being inboard of said end-convolution of the flex hose and within the overlap region, the outboard ends of said slots being spaced from said one end of the flex hose, whereby said end-convolution of said non-uniform width portion of said helical strip is of unitary structure, a clamp band disposed around said flex hose and covering said slot for clamping the flex hose and pipe together and for collapsing the overlap region of said flex hose by circumferential slippage of adjacent convolutions to reduce the circumference of the flex hose and thereby cause close engagement of said flex hose with the pipe and with the clamp band.

2. The coupling as defined in claim 1 wherein:

said strip is sheet metal having a cross-section in the shape of an S-hook having straight-sided hook portions whereby said interlock seam comprises interleaved hook portions providing a helical passage within the seam, said slot defining an opening through the interleaved hook portions, each layer of hooked portions being in engagement with the adjacent layer around the periphery of the slot whereby gas flow into the slot from the helical passage is inhibited.

3. The coupling as defined in claim 1 wherein:

the axial length of said slot is at least as great as the width of said strip but less than twice the width of said strip.

4. The coupling as defined in claim 3 wherein:

said band has a width which is approximately 1.4 times the axial length of said slot.

5. The coupling as defined in claim 3 wherein:

said slot has a width in the circumferential direction which is approximately one-fifth of the width of said strip.

6. A coupling as defined in claim 1 wherein said clamp is a band clamp comprising:

a band having a cross-section including a roundish sector and a radially projecting channel-shaped sector, said channel-shaped sector comprises a pair of sidewalls extending outwardly from the roundish sector and being separated from each other at the outer ends to form an opening in the band, a spline disposed between the sidewalls and having a pair of surfaces which are respectively opposite said pair of sidewalls, one of said surfaces of said spline being concave, a bar disposed against one sidewall opposite said concave surface of the spline, said tightening means including at least one bolt and nut with the bolt extending laterally through the said bar, sidewalls and spline and being adapted to force the sidewalls against the respective surfaces of the spline, whereby the band is stretched around said overlap region.

7. A method of making a coupling between a rigid pipe and a flex hose of the type having a cylindrical wall comprising a helical strip with multiple convolutions and an interlock seam between adjacent convolutions, said interlock seam comprising interleaved layers of adjoining convolutions, said seam forming an inside helical groove and an outside helical groove between adjacent seams, said helical strip having a uniform width portion extending throughout multiple convolutions, said flex hose terminating at one end in an end-convolution of said strip which diminishes in width toward the free end thereof, said method comprising the steps of:

forming plural slots in the wall of the flex hose, said slots extending across said strip at circumferentially spaced locations in a single convolution of said uniform width portion of said strip, said single convolutions adjoining said end-convolution, the outboard ends of said slots being spaced from said one end of the flex hose so that said end-convolution is not severed from said strip, inserting one end of the rigid pipe into said one end of the flex hose with said one end of the pipe extending past the inboard ends of the slots, disposing a clamp band around the flex hose in a position to cover the slot, and applying a sufficient radial force by tightening the clamp band to (1) reduce the circumference of said strip so that it conforms to the outer radius of said pipe and thereby obtain close sealing engagement thereof with the outer surface of said pipe, and (2) collapse said plurality of interleaved layers into close sealing engagement with each other thereby substantially blocking gas leakage from the inside helical groove through the interleaved layers to the outside helical groove.

* * * * *